United States Patent [19]

Haendle

[11] 4,442,537
[45] Apr. 10, 1984

[54] DIAGNOSTIC X-RAY INSTALLATION

[75] Inventor: Joerg Haendle, Erlangen, Fed. Rep. of Germany

[73] Assignee: Siemens Aktiengesellschaft, Berlin & Munich, Fed. Rep. of Germany

[21] Appl. No.: 377,465

[22] Filed: May 12, 1982

[30] Foreign Application Priority Data

May 18, 1981 [DE] Fed. Rep. of Germany ....... 3119751

[51] Int. Cl.³ .............................................. G03B 41/16
[52] U.S. Cl. ..................................... 378/99; 358/111; 378/108
[58] Field of Search ................... 378/99, 108; 358/111

[56] References Cited

U.S. PATENT DOCUMENTS 4,017,679  4/1977  Kemner ................................. 378/99

FOREIGN PATENT DOCUMENTS 2010360  4/1977  Fed. Rep. of Germany .

Primary Examiner—Craig E. Church
Attorney, Agent, or Firm—Hill, Van Santen, Steadman & Simpson

[57] ABSTRACT

An exemplary embodiment includes an x-ray generator, an x-ray tube, and an x-ray image intensifier television chain, which comprises an x-ray image intensifier, an optical coupling member, a television pick-up tube of the vidicon type, a video amplifier, a regulating installation for the illumination level of the television pick-up tube, a control device for the control of the functional sequences and for the generation of the synchronous clock pulse frequencies, a deflection and focusing unit, and a video monitor. The control device is so designed that through the latter the regulating installation is capable of being switched over to a higher setpoint value; the deflection and focusing unit, to an operation for scanning with reduced frequency; and the x-ray generator to pulse operation with an increased dose rate.

16 Claims, 1 Drawing Figure

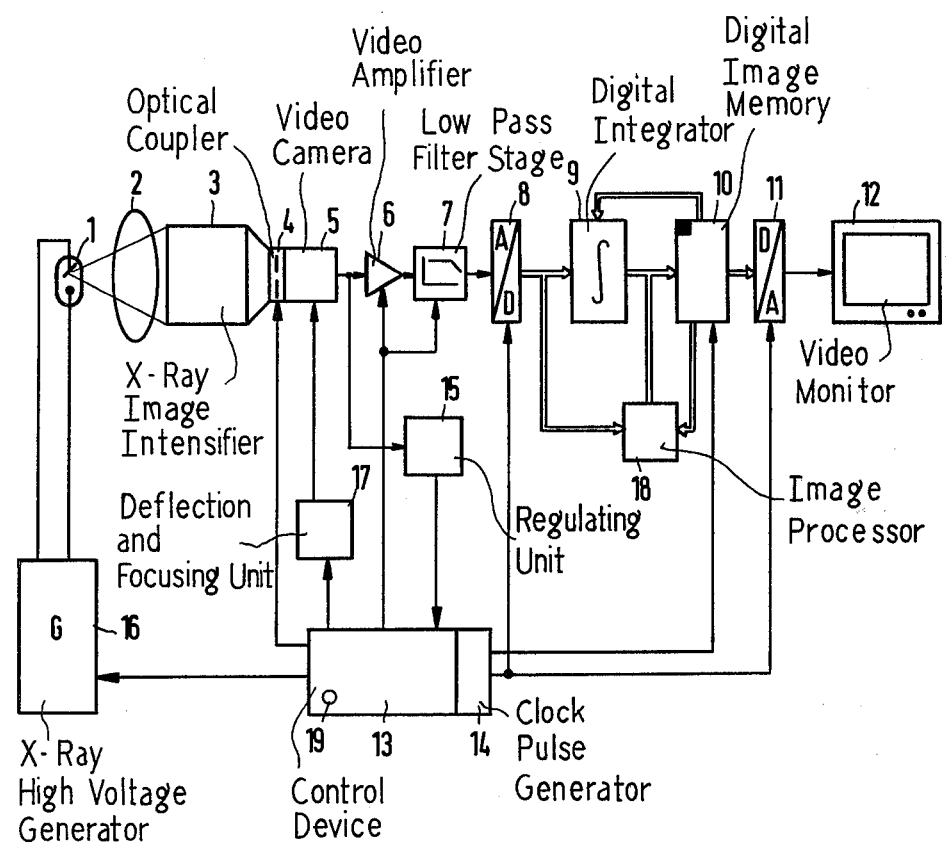

DIAGNOSTIC X-RAY INSTALLATION

BACKGROUND OF THE INVENTION

The invention relates to a diagnostic x-ray installation comprising an x-ray generator, an x-ray tube, and an x-ray image intensifier-television chain which includes an x-ray image intensifier, an optical coupling member, a television camera tube of the vidicon type, a video amplifier, a regulating installation for the illumination level of the television camera tube, a control device for controlling the functional sequences and for generating the synchronous clock pulse frequencies, a deflecting and focusing unit, and a monitor. A diagnostic x-ray installation of this type is employed in angiography, particularly in the case of cranial examinations.

In German AS 20 10 360, a diagnostic x-ray installation of this type is described. A control arrangement, through actuation of a switch, effects a brief increase in the dose rate of the x-ray tube. Simultaneously a diaphram, designed as an iris diaphram, is altered, so that the illumination level of the television camera tube is kept constant. In the fluoroscopic operation, in the case of phases which are of particular interest, a television picture with a low proportion of quantum noise is hereby generated by pressing the switch. It proves disadvantageous that the radiation exposure of the patient is simultaneously increased. Moreover, only the ratio of the useful-to-interference signal in the radiation image is improved. However, the interfering influence of the noise sources of the television chain is maintained

SUMMARY OF THE INVENTION

The invention proceeds from the object of producing a diagnostic x-ray installation of the type initially cited which renders possible a viewing having a high image quality with only a low noise component and low radiation exposure of the patient.

In accordance with the invention, the object is achieved in that the control device is so designed that through the latter the regulating installation can be switched over to a higher setpoint value, the deflection unit can be switched over to an operation for scanning with lowered frequency and the x-ray generator can be switched over to pulse mode operation. The dose rate is thereby indeed increased; however, the radiation exposure remains the same due to the pulse mode of operation. The television camera tube, in spite of slow scanning, on account of the increased light quantity in comparison with normal operation, delivers a high signal current as a consequence of which the signal-to-noise ratio is considerably improved.

High frequency noise components can be eliminated if the video amplifier is designed to be capable of being switched over in its band-width and if the control device lowers the band-width of the video amplifier. Very good properties regarding light overdriving are attained by a television camera tube which is a chalcogenide-vidicon. Digital modules with increased amplitude resolution can be employed if, through the control device, the clock pulse frequencies for the image memory and the associated coverters can be reduced. The image noise can be yet further reduced if a digital integration stage is series-connected with the image memory, the inputs of said integration stage being connected with the outputs of an A/D-converter and of the image memory. The visibility of details in the digital image can be yet further increased if the image memory is connected with an image processing installation which conducts, in image point fashion, a subtraction, a mean value formation, and/or a logarithmizing of digitized video signals of various television pictures. The high frequency noise components can be yet further reduced by a low pass filter stage connected with the output of the video amplifier.

The invention shall be explained in greater detail in the following on the basis of an exemplary embodiment illustrated on the accompanying drawing sheet; and other objects, features and advantages will be apparent from this detailed disclosure and from the appended claims.

BRIEF DESCRIPTION OF THE DRAWINGS

The single FIGURE is an electric circuit diagram for illustrating a diagnostic x-ray installation in accordance with the present invention.

DETAILED DESCRIPTION

In the FIGURE an x-ray tube 1 is illustrated which emits a radiation beam which penetrates a patient 2 and generates a radiation image on the inlet screen an x-ray image intensifier 3. The radiation image is converted in the x-ray image intensifier 3 and is displayed in intensified form on the outlet fluorescent screen. An optical coupling member 4 with a mechanical diaphram images the x-ray image on the target of a television camera tube 5. The video signal picked up on the target of the television camera tube 5 is amplified in a video amplifier 6 and supplied to a low pass filter stage 7 with a switchable cut-off frequency. The video signal with the decreased high frequency component from the low pass filter stage 7 is supplied to an analog-to-digital converter (A/D converter) 8. An outlet-connected integration stage 9 integrates the digital video signals in a image-point-fashion over several images and supplies a resulting integrated output to a digital image memory 10 which is capable of storing one or more television pictures or video images in digital form and is capable of reproducing at least two television pictures in chronologically parallel and synchronous fashion. The stored images are converted to analog video signals in a digital-to-analog converter (D/A converter) 11 and are displayed as television pictures on a monitor 12.

A control device 13 controls the functional sequences of the unit. A clock pulse generator 14 pertaining to said control device 13 generates the clock pulse frequency for the A/D converter 8, the D/A converter 11, and the image memory 10, which are connected with said clock pulse generator 14. A regulating installation 15 is connected with the output of the television camera tube 5 and delivers a regulating signal to the control device 13. The latter is connected with an x-ray generator 16 and a mechanical diaphragm of the optical coupling member 4 and controls both in such a manner that the illumination level of the television camera tube corresponds to the nominal or setpoint value adjusted in the regulating installation 15. Connected to the control device is a deflection and focusing unit 17 which is connected with the non-illustrated deflection—and focusing—coils of the television camera tube 5. An image processing installation 18 is connected with the digital image memory 10. It can conduct, for example, a subtraction of the digital signals from two stored television pictures or between the stored and newly arriving digitized video signals. It can also form a chronological mean value or logarithmized the video signals.

A switch 19 mounted on the control device 13 switches over the diagnostic x-ray installation from normal fluoroscopy operation to an operation with reduced picture repetition frequency. To this end, the x-ray generator 16 is switched over from continuous operation to pulse mode operation with an increased dose rate. Simultaneously, the deflection and focusing unit 17 is switched to a scanning with lowered frequency. The band-width of the video amplifier 6 and the cut-off frequency of the low pass filter 7 are likewise decreased. The nominal or setpoint value of the regulating installation 15 is effectively increased so that the light quantity striking the target of the television camera tube 5, which is dependent upon the dose rate of the x-ray tube 1 as well as upon the aperture of the mechanical diaphram of the optical coupling member 4, is increased. The synchronous clock pulse frequencies of the clock pulse generator 14 are likewise lowered so that the converters 8 and 11 operate with reduced clock pulse frequency and increased amplitude resolution. Instead of the switch-over of converters 8 and 11, also two different converters having different amplitude resolution and different clock pulse frequencies can be employed, respectively, and can be selectively connected into the video circuit.

If the x-ray images are scanned with a low repetition frequency, then it is necessary, if operation is carried out in the fluoroscopy operation, for a specific standard conversion in the digital image memory 10 to be provided which renders possible a continuous display of the stored television pictures on at least one monitor. In this manner, the respective state, as in the case of the conventional angiography systems, can be controlled. However, the television images exhibit a greater inertia (time lag) which, however, in many instances, does not interfere. If additionally only the addresses of the image points are stored at which a change has taken place as a consequence of contrast medium flow, then it is possible to represent the optimum filling state in the case of an examination without an additional peripheral memory.

However, also subtraction images with low digital amplitude resolution should be capable of being stored in the digital image memory. In this case, one likewise requires less memory space in order to store e.g. several subtraction images; i.e., a chronological segment of the contrast medium filling operation.

In the following several numerical values are indicated as an example which values are intended to show the advantages of the invention. The signal current I, derived from the target of the vidicon, is dependent upon the charge Q on the target of the television camera tube 5 and its scanning time t.

$$I = \frac{dQ}{dt}$$

Thus, in the case of conventional slow scanning, the signal current decreases, as the consequence of which the signal-to-noise ratio is not improved. Through an increased exposure, a greater charge forms on the target so that the signal current, with simultaneous slow scanning, remains approximately constant. Through a reduction of the band-width of the system, the signal-to-noise ratio is considerably improved. Through the slow scanning, the increased charge, which, in the case of normal scanning, could lead to a limitation of the beam current and hence to an incomplete discharge, dies out completely.

If the image scanning period amounts, for example, to one hundred to five hundred milliseconds (100 to 500 ms) and if the light quantity striking the target is increased, for example, by a factor of ten to twenty, there results, in comparison with the conventional slow scanning, ten to twenty times greater signal current. If additionally the video band-width is reduced from 20 MHz to 1 MHz, a signal-to-noise ratio improved approximately by a factor of thirty to forty results therefrom.

The rapid A/D converters conventional today, which are normally necessary for the television system, exhibit an amplitude resolution of eight bits. Due to the slow scanning, the scanning frequency can be reduced so that slower converters with an amplitude resolution of twelve bits for example can be employed. The sensitivity of the system is thereby increased, so that already low contrast medium quantities suffice in order to obtain an angiography image having good visibility of the vessels containing such low quantities of contrast medium.

With a diagnostic x-ray installation according to the invention, images can thus be obtained having a high resolution with a simultaneously low noise component.

It will be apparent that many modifications and variations may be made without departing from the scope of the teachings and concepts of the present invention.

SUPPLEMENTARY DISCUSSION

In accordance with the foregoing disclosure, the method of operation of the system may be summarized as follows:

In normal fluoroscopy, a mean value of the video signal supplied by the camera tube 5 may be utilized as a measure of the actual light intensity of the optical image supplied by the optical coupling member 4. Thus regulating installation 15 may include a mean value circuit and a comparison circuit for comparing the mean value of the video signal with a mean value setpoint signal representing the desired mean brightness of the light image impinging on the input of the camera tube 5. During such normal operation, the resultant regulating or mean value error signal from regulating installation 15 is utilized by control device 13 to control the mechanical diaphragm of the coupling member 4 and the x-ray generator 16 in a conventional manner.

Upon activation of switch 19, the control device 13 no longer responds to the mean value error from regulating installation 15. Instead, the control device 13 may receive a peak value error signal from regulating installation 15 which is responsive to the peak values of the light intensities supplied to the video camera 5 via the optical coupling member 4 during pulse operation of the x-ray tube 1. For example, the regulating installation 15 may include a peak value circuit also connected with the video output from camera tube 5. A peak value comparator circuit may compare the actual peak value signal with a peak value setpoint signal, and supply the resultant peak value error signal to the control device 13. The peak value setpoint signal may be such that the average dose rate received by the patient is the same as during normal fluoroscopy even though the peak x-ray dose rate during pulse operation of the x-ray tube 1 is higher than the maximum x-ray dose rate during normal fluoroscopy. Also the aperture of the mechanical diaphragm of the optical coupling member 4 is increased in size during pulse operation so that the average light intensity incident on the input of the camera tube 5 is increased in comparison to the average light intensity incident on the camera tube during normal fluoroscopy. Thus a greater charge image forms on the target of the camera tube 5, so that the average signal current with slow scanning operation of the camera tube 5 is approximately the same as during normal fluoroscopy with a normal television scan rate of fifty or sixty fields per second. By way of example, the reduced scan rate of the camera tube 5 during pulse operation may be one-fifth the normal television scan rate, and the band-width of the video signal transmitted by the video amplifier circuit 6,7 may be reduced by a factor of one-fifth, to provide a scanning rate of about ten images per second, and a band-width of not more than about four megahertz. The peak light intensity of the light image impinging on the video camera 5 during pulse operation of x-ray tube 1 may exceed the average light intensity impinging on the video camera during normal fluoroscopy by a factor of at least about ten.

An example of a peak value circuit for a video signal is indicated within a rectangle sixteen of my pending application U.S. Ser. No. 343,535 filed Jan. 28, 1982, (VPA 81 P 5005). This circuit can be constructed as a mean, value circuit by the addition of a suitable shunt resistance as is indicated by dash lines in component sixteen. This application U.S. Ser. No. 343,535 at page 7, the second full paragraph, explains the use of image point integration (pixel by pixel) of successive low amplitude video signals for the sake of control of dose rate, and this procedure may be used with image memory 10 and processing circuit 18 of the present drawing.

As disclosed in German application No. P 31 22 098.3 filed June 3, 1981 (VPA 81 P 5037) in conjunction with the article referenced therein from the conference publication IEEE Catalog No. 76 CH 1160-1C, 1976, pages 255 through 260, a series of contrast-medium-free images may be logarithmically averaged on a pixel by pixel basis to obtain a resulting averaged value $\overline{Dp}(0)$, which may be represented by the formula:

$$\overline{Dp}(0) = \frac{1}{N} \overset{N}{\Sigma} \log I_p(0)$$

where N is the number of images in the non-opacified series, and Ip(0) refers to the input image signals of such series. Specifically the above referenced German application shows a logarithmizer circuit eleven, an analog to digital converter twelve, a mean value forming and summation circuit thirteen, and an image memory fourteen for storing the resultant averaged value.

Similarly in the referenced German application a series of opacified images may be formed into a resultant averaged value $\overline{Dp}(1)$ and stored in a separate image memory fifteen. The values in image memories fourteen and fifteen are then supplied on a pixel by pixel basis to a subtractor sixteen which forms a resultant subtraction image $$Dp = \overline{Dp}(0) - \overline{Dp}(1).$$

This resultant subtraction image is then converted into an analog signal and delogarithmized so as to provide a video signal for display on a suitable video display, e.g, twenty, which then shows only the vessels filled with contrast medium (i.e. no longer contains the background which is always the same).

A process of histogram equalization which may be applied to the resultant subtraction image is disclosed in U S. application Ser. No. 349,373 filed Feb. 16, 1982, and in the corresponding German application P 31 07 901.6 filed Mar. 2, 1981, VPA 81 P 5006.

I claim as my invention:

1. A diagnostic x-ray installation comprising an x-ray high voltage generator (16), an x-ray tube (1), and an x-ray image intensifier television chain which includes an x-ray image intensifier (3), an optical coupling member (4), a television camera tube (5) of the vidicon type, a deflection and focusing unit (17) for controlling scanning frequency and focusing of the camera tube (5), a video amplifier (6), a regulating installation (15) for regulating the illumination level of the television camera tube (5) in accordance with a setpoint value, a control device (13) for the control of the x-ray high voltage generator (16) and the optical coupling member (4) and for controlling the generation of synchronous clock pulse frequencies, and a video monitor, characterized in that the control device (13) controls the operation of the regulating installation (15) so that control of the illumination level of the camera tube (5) is switched over to a higher setpoint value, the deflection and focusing unit (17) is switched over to effect operation of the television camera tube with a lowered scanning frequency, and the x-ray high voltage generator (16) is switched over to pulse mode operation with an increased dose rate.

2. A diagnostic x-ray installation according to claim 1, characterized in that the video amplifier (6) is designed to be capable of being switched over in its bandwidth, and that the control device (13) lowers the bandwidth of the video amplifier (6) during said operation of the television camera tube with lowered scanning frequency.

3. A diagnostic x-ray installation according to claim 1, characterized in that the television camera tube (5) is a chalcogenide-vidicon.

4. A diagnostic x-ray installation according to claim 1, further comprising a digital image memory (10) connected with the output of the video amplifier, and converter means (8, 11) associated with the digital image memory (10), characterized in that, through the control device (13), clock pulse frequencies for the image memory (10) and the associated converter means (8, 11) are reducible.

5. A diagnostic x-ray installation according to claim 4, with said converter means comprising an analog to digital converter (8) connected with the output of the video amplifier, characterized in that there is series-connected with the image memory (10) a digital integration stage (9), whose inputs are connected with outputs of the analog to digital converter (8) and of the image memory (10).

6. A diagnostic x-ray installation according to claim 4, further comprising an image processing installation (18), characterized in that the image memory (10) is connected with the image processing installation (18), said image processing installation (18) being operable in image-point fashion to effect a subtraction of digitized video signals.

7. A diagnostic x-ray installation according to claim 1, characterized in that a low pass filter stage (7) is connected with the output of the video amplifier (6).

8. A diagnostic x-ray according to claim 1, with said television camera tube comprising a chalcogenidevidicon, said control device (13) being coupled with said video amplifier (6) and being operable when the deflection and focusing unit (17) is switched over to effect scanning by the chalcogenide-vidicon camera tube with the lowered scanning frequency to switch over the video amplifier (6) to lower the band-width thereof.

9. A diagnostic x-ray installation according to claim 4, with an image processing installation (18) connected with said image memory (10), said image processing installation (18) being operable in an image-point fashion to process digitized video signals and to supply to the image memory (10) a mean value digitized video signal representing a mean value with respect to each respective image point of the processed digitized video signals.

10. A diagnostic x-ray installation according to claim 4, with an image processing installation (18) connected with said image memory (10), said image processing installation (18) being operable in an image-point fashion to process digitized video signals and to supply to the image memory (10) a logarithmized video signal representing a logarithmizing and image point summation of the processed digital video signals.

11. A diagnostic x-ray installation according to claim 7, with said control device (13) being coupled with said low pass filter stage (7) and being operable when the deflection and focusing unit (17) is switched over to effect scanning by the camera tube with the lowered scanning frequency to actuate said low pass filter stage to limit the band-width of the signal transmitted thereby.

12. A method of operating a diagnostic x-ray installation to selectively increase the signal to noise ratio of the video signal supplied by an x-ray image intensifier television chain while minimizing the x-ray exposure of a patient, wherein the installation includes an x-ray high voltage generator and an x-ray tube for energization by the high voltage generator to produce an x-ray beam for use in the examination of a patient, the x-ray image intensifier television chain including an x-ray image intensifier responsive to an input x-ray image for producing a light image in according with the input x-ray image, and a video camera coupled with the x-ray image intensifier for scanning of the light image therefrom to produce a video signal, said method comprising: operating said x-ray tube with a x-ray tube high voltage for normal fluoroscopy operation and regulating the intensity of the high voltage and current of the X-ray tube to maintain a first relatively constant average illumination of the video camera, and operating said video camera at a first scanning rate so as to supply a video signal having a normal television line rate; and selectively, in order to obtain an image with higher signal to noise ratio, switching over the high voltage generator to pulse operation, and regulating the intensity of the high voltage and current of the X-ray tube to maintain a second relatively constant average illumination of the video camera which is substantially higher than said first relatively constant average illumination, but operating the high voltage generator with a pulse duration and a pulse period such that the average dose rate for the patient is not substantially increased, and operating said video camera with a second scanning rate which is substantially lower than said first scanning rate so as to supply a video signal having a reduced video line rate and having a correspondingly reduced essential band-width, whereby an improved signal to noise ratio can be insured.

13. A method in accordance with claim 12, wherein the installation further includes a video amplifier circuit coupled with the output of the video camera, said method further comprising operating said video amplifier circuit with a relatively wide band-width of the order of at least ten megahertz during the normal fluoroscopy operation, and during operation of the video camera with a second scanning rate reducing the band-width of the transmitted video signal by a factor at least comparable to the reduction of the second scanning rate in comparison to the first scanning rate.

14. A method in accordance with claim 13, wherein the second scanning rate has a period at least about five times as long as that of said first scanning rate.

15. A method in accordance with claim 14, wherein the video amplifier circuit is operated with a band-width of about four megahertz while the video camera is operated with a scanning rate of not more than about ten images per second.

16. A method in accordance with claim 14, wherein the peak light intensity of the light image impinging on the video camera during each pulse of x-ray energy, for pulse operation of the x-ray tube, exceeds the average light intensity impinging on the video camera during normal fluoroscopy operation by a factor of at least about five.

* * * * *